(12) United States Patent
Inaba et al.

(10) Patent No.: US 8,334,032 B2
(45) Date of Patent: Dec. 18, 2012

(54) FUEL TANK AND METHOD FOR PRODUCING THE SAME

(75) Inventors: Takeshi Inaba, Settsu (JP); Shigehito Sagisaka, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 429 days.

(21) Appl. No.: 12/443,361

(22) PCT Filed: Sep. 28, 2007

(86) PCT No.: PCT/JP2007/069036
§ 371 (c)(1),
(2), (4) Date: Mar. 27, 2009

(87) PCT Pub. No.: WO2008/041645
PCT Pub. Date: Apr. 10, 2008

(65) Prior Publication Data
US 2010/0035004 A1    Feb. 11, 2010

(30) Foreign Application Priority Data

Sep. 29, 2006 (JP) ................................. 2006-269880
Feb. 21, 2007 (JP) ................................. 2007-041430

(51) Int. Cl.
*B29D 22/00* (2006.01)
*B29D 23/00* (2006.01)
*B32B 1/08* (2006.01)

(52) U.S. Cl. ....... 428/35.7; 428/421; 428/422; 156/242; 220/4.12; 220/4.14; 220/905

(58) Field of Classification Search ................. 428/35.7, 428/421, 422; 156/242; 220/4.12, 4.14, 220/905
See application file for complete search history.

(56) References Cited

U.S. PATENT DOCUMENTS

| | | | |
|---|---|---|---|
| 4,933,060 A * | 6/1990 | Prohaska et al. ......... | 204/192.36 |
| 6,077,609 A * | 6/2000 | Blong et al. .................. | 428/412 |
| 6,398,059 B1 | 6/2002 | Hayashi et al. | |
| 6,740,375 B1 | 5/2004 | Sagisaka et al. | |
| 2004/0096611 A1 * | 5/2004 | Lucke et al. ................. | 428/35.7 |
| 2004/0144780 A1 | 7/2004 | Brandner et al. | |
| 2005/0140052 A1 | 6/2005 | Brandner et al. | |
| 2006/0068139 A1 | 3/2006 | Fujitaka et al. | |

FOREIGN PATENT DOCUMENTS

| | | | |
|---|---|---|---|
| EP | 1195387 A1 | 4/2002 | |
| EP | 1442910 A1 * | 8/2004 | |

(Continued)

OTHER PUBLICATIONS

JP2004231174 abstract translation.*

*Primary Examiner* — Michael C Miggins
(74) *Attorney, Agent, or Firm* — Sughrue Mion, PLLC (57) ABSTRACT

The present invention provides a fuel tank excellent in strength, low fuel permeability and durability in spite of its being light in weight as well as a method of producing such fuel tank by which the tank can be molded in a complicated shape with ease and at low production cost. The present invention is a fuel tank, produced by joining of at least two discrete parts of a tank and each having a laminate structure comprising a fluororesin layer and a thermoplastic resin layer in such a manner that at least the fluororesin layers of the parts are joined together to form the inner surface layer of the fluororesin layer.

7 Claims, 1 Drawing Sheet

FOREIGN PATENT DOCUMENTS

| | | |
|---|---|---|
| JP | 05-008353 A | 1/1993 |
| JP | 5016938 * | 1/1993 |
| JP | 5016938 A | 1/1993 |
| JP | 11-221858 | 8/1999 |
| JP | 2001-206076 A | 7/2001 |
| JP | 2002144891 A | 5/2002 |
| JP | 2004-098886 A | 4/2004 |
| JP | 2004098886 A | 4/2004 |
| JP | 2004-231174 * | 8/2004 |
| JP | 2004-231174 A | 8/2004 |
| JP | 2004-262451 * | 9/2004 |
| JP | 2004-262451 A | 9/2004 |
| JP | 2004-358959 A | 12/2004 |
| JP | 2005007943 * | 1/2005 |
| JP | 2005007943 A | 1/2005 |
| JP | 2005170167 A | 6/2005 |
| JP | 2006513062 T | 4/2006 |
| JP | 2006-151442 A | 6/2006 |
| JP | 2006160093 A | 6/2006 |
| KR | 10-0265292 B1 | 10/2000 |
| KR | 2002-0034082 A | 5/2002 |
| KR | 2002-0035863 A | 5/2002 |

* cited by examiner

Fig. 1

FUEL TANK AND METHOD FOR PRODUCING THE SAME

TECHNICAL FIELD

The present invention relates to a fuel tank and a method of producing the same.

BACKGROUND ART

A Fuel tank in conventional use has been made of metal; from the vehicle weight reduction, corrosion resistance and processability (into desired forms and shapes) points of view, however, thermoplastic resin-based ones have been proposed. Such thermoplastic fuel tanks which are currently in use consists of a polyolefin resin layer and an ethylene/vinyl alcohol [EVOH] resin-based barrier layer as produced by multilayer blow molding. For multilayer blow molding, however, an apparatus equipped with a mold for molding a fuel tank as a whole is required and, therefore, there arise various problems, namely high equipment cost, difficulty in adjusting the tank inner layer wall thickness, low design freedom, and lengthy molding cycle, among others. Further, since the EVOH resin is not satisfactory in gasoline resistance, it cannot be used as the innermost layer, so that problems arise: for example, the laminate structure may become complicated or there may appear a blow molding joint site where there is no EVOH resin layer.

As a thermoplastic resin-based fuel tank improved in low fuel permeability and/or flexibility, the following ones have been proposed, among others:

A Fuel tank molded from surface-fluorinated resin particles obtained by subjecting olefinic resin particles to surface fluorination treatment (cf. e.g. Patent Document 1: Japanese Kokai Publication 2005-170167); and A Fuel tank comprising a permeation preventing layer made of an inorganic substance or a thermoplastic resin with an inorganic substance dispersed therein and a thermoplastic resin layer (cf. e.g. Patent Document 2: Japanese Kokai Publication 2002-144891).

However, even these methods cannot yet bring about necessary improvements; thus, a fuel tank more inexpensive and more improved in performance characteristics is demanded.

From such viewpoints, a method of molding a fuel tank which comprises joining together a plurality of constituent members molded in advance. As such a fuel tank, the following have been proposed, among others:

A fuel tank made of a resin composition resulting from blending of a polyoxymethylene resin and a carboxylic acid group or like group-containing olefin copolymer in a specific proportion (cf. e.g. Patent Document 3: Japanese Kokai Publication 2005-7943);

A fuel tank produced by a method comprising molding a pair of moldings made of a sheet-shaped laminate consisting of an internal layer, a permeation-preventing film or membrane and an outside layer and fusion bonding the pair of moldings together at the peripheries thereof (cf. e.g. Patent Document 4: Japanese Kokai Publication H05-16938);

A fuel tank produced by a method comprising joining an injection molded upper and lower moldings together by fusion bonding at the each split-opening peripheral edges and providing the thus-obtained substrate layer with a synthetic resin barrier layer integrally on the tank inside surface of the substrate layer by injection molding or injection compression molding (cf. e.g. Patent Document 5: Japanese Kokai Publication 2004-98886);

An automotive fuel tank formed of a thermoplastic synthetic resin-based inner resin layer and an outside resin layer which are produced by a method comprising joining an upper tank portion and a lower tank portion individually molded separately at the opening peripheries and coating the whole outer surface of the thus-formed inside resin layer integrally with an outer surface resin layer (cf. e.g. Patent Document 6: Japanese Kokai Publication 2006-160093); and A fuel tank produced by a method comprising molding a plurality of plastic sheets respectively by vacuum forming and overlaying the peripheral seal regions of the respective moldings obtained with one another, followed by sealing by fusion bonding (cf. e.g. Patent Document 7: Japanese Kohyo Publication 2006-513062).

However, those fuel tanks are not yet satisfactory with respect to such performance characteristics as low fuel permeability and gasoline resistance.

Such conventional art fuel tanks, irrespective of the method of molding thereof, are insufficient in low fuel permeability, in particular poor in low fuel permeability against bio-fuels in current use and also insufficient in chemical resistance.

DISCLOSURE OF INVENTION

Problems which the Invention is to Solve

It is an object of the present invention to provide a fuel tank excellent in strength, low fuel permeability and durability in spite of its being light in weight as well as a method of producing such fuel tank by which the tank can be molded in a complicated shape with ease and at low production cost.

Means for Solving the Problems

The present invention is a fuel tank, produced by joining of at least two discrete parts of a tank and each having a laminate structure comprising a fluororesin layer and a thermoplastic resin layer, at least the fluororesin layers of the parts being joined together to form the inner surface layer of the fluororesin layer.

The invention is also a method of producing the fuel tank mentioned above, which comprises:

(1) the step of producing a plurality of molded parts each having the laminate structure comprising the fluororesin layer and the thermoplastic resin layer and (2) the step of joining the molded parts obtained in the above step (1) in such a manner that at least the fluororesin layers may jointly form the inner surface layer.

In the following, the present invention is described in detail.

The fuel tank of the invention is produced by joining at least two separate parts together. Each of the parts has a laminate structure comprising a fluororesin layer and a thermoplastic resin layer.

The term "joining" as used herein means adhesion, by heat fusion or the like, of the molded parts to an extent such that no fuel leakage may occur at the joints.

The fuel tank mentioned above is a product obtained by joining the above-mentioned parts each having a laminate structure together for integration and, therefore, is excellent in strength and low fuel permeability and, in addition, since the inner surface-constituting fluororesin is excellent not only in low fuel permeability but also in gasoline resistance, the laminate structure can be simplified, possibly resulting in reduction in costs. Furthermore, the above fuel tank is constituted by joining the barrier layer-constituting fluororesin layers together so that they may constitute the inner surface and, therefore, the tank is also advantageous in that there is no barrier-lacking site even at the end portions. Furthermore, such laminate structure can favorably be produced with ease by such a simple and easy method as injection molding or laminated sheet thermoforming.

In the practice of the invention, the fluororesin constituting the above-mentioned fluororesin layer is a homopolymer or copolymer comprising repeating units derived from at least one fluorinated ethylenic monomer.

The fluororesin may be a polymer obtained by polymerization of a fluorinated ethylenic monomer or monomers alone or by polymerization of a fluorinated ethylenic monomer or monomers and a fluorine atom-free ethylenic monomer or monomers.

In the practice of the invention, the fluororesin layer may be one comprising only one or two or more of such fluororesin species as mentioned above.

The fluorinated ethylenic monomer is not particularly restricted but may be any of those fluorine atom-containing olefinically unsaturated monomers such as, for example, tetrafluoroethylene [TFE], vinylidene fluoride, chlorotrifluoroethylene [CTFE], vinyl fluoride, hexafluoropropylene [HFP], hexafluoroisobutene, monomers represented by the formula (i):

$$CH_2=CX^1(CF_2)_nX^2 \qquad (i)$$

(wherein $X^1$ is H or F, $X^2$ is H, F or Cl and n is an integer of 1 to 10), and perfluoro (alkyl vinyl ether) species.

The fluorine atom-free ethylenic monomer is preferably selected from among ethylenic monomers containing not more than 5 carbon atoms from the heat resistance and/or chemical resistance maintenance viewpoint, among others. As such monomers, there may be mentioned, for example, ethylene, propylene, 1-butene, 2-butene, vinyl chloride and vinylidene chloride.

When the above fluororesin is produced by using a fluorinated ethylenic monomer(s) and a fluorine atom-free ethylenic monomer(s), the monomer composition thereof may be such that amount of the fluorinated ethylenic monomer(s) accounts for 10 to 100 mole percent (preferably 30 to 100 mole percent) and that of the fluorine atom-free ethylenic monomer(s) for 0 to 90 mole percent (preferably 0 to 70 mole percent).

As the fluororesin to be used in the practice of the invention, there may be mentioned chlorotrifluoroethylene [CTFE]-based polymers, tetrafluoroethylene/hexafluoropropylene [FEP]-based copolymers, tetrafluoroethylene/perfluoro (alkyl vinyl ether) [PFA]-based copolymers, ethylene/tetrafluoroethylene [ETFE]-based copolymers, ethylene/tetrafluoroethylene/hexafluoropropylene [EFEP]-based copolymers, and poly(vinylidene fluoride) [PVdF]-based polymers, among others.

The above fluororesin is preferably a perhalopolymer. By using a perhalopolymer, it becomes possible to further improve the chemical resistance and low fuel permeability. The perhalopolymer is a polymer in which halogen atoms are bound to all carbon atoms constituting the main chain of the polymer.

The above-mentioned fluororesin is more preferably a CTFE-based polymer, a FEP-based copolymer or a PFA-based copolymer and, from the flexibility and low fuel permeability points of view, it is still more preferably a CTFE-based polymer or a FEP-based copolymer.

These preferred fluororesins are superior in low fuel permeability against alcohol fuels and like mixed fuels and can give a fuel tank having a sufficient level of low fuel permeability.

As the CTFE-based polymer, there may be mentioned, for example, polychlorotrifluoroethylene [PCTFE] and a CTFE-based copolymer.

Preferred as the CTFE-based copolymer is those whose constituent elements are CTFE units, TFE units and monomer [α] units derived from at least one monomer α copolymerizable with CTFE and TFE and in which the sum of the CTFE units and TFE units amounts to 90 to 99.9 mole percent and the monomer [α] units amount to 0.1 to 10 mole percent. When the monomer [α] unit content is lower than 0.1 mole percent, the moldability, environmental stress cracking resistance and fuel-due cracking resistance tend to become poor and, when it is above 10 mole percent, the low fuel permeability, heat resistance and mechanical characteristics tend to become inferior.

When the monomer [α] is a PAVE, a more preferred lower limit to the monomer [α] unit content is 0.5 mole percent and a more preferred upper limit thereto is 5 mole percent.

The ratio between the CTFE units and TFE units in the CTFE-based copolymers mentioned above is such that the CTFE units amount to 15 to 90 mole percent and the TFE units to 85 to 10 mole percent, more preferably the CTFE units amount to 20 to 90 mole percent and the TFE units to 80 to 10 mole percent.

The "CTFE unit" and "TFE unit" so referred to herein are respectively a CTFE-derived moiety [—CFCl—CF$_2$—] and a TFE-derived moiety [—CF$_2$—CF$_2$—] in the molecular structure of the CTFE copolymer and, similarly, the "monomer [α] unit" is a moiety resulting from addition of the monomer [α] in the molecular structure of the CTFE-based copolymer.

The monomer unit content, for example the CTFE unit content, so referred to herein, is the value obtained by carrying out $^{19}$F-NMR analysis.

The above-mentioned monomer [α] is not particularly restricted but may be any of those monomers copolymerizable with CTFE and TFE; thus, there may be mentioned, for example, ethylene [Et], vinylidene fluoride [VdF], perfluoro (alkyl vinyl ether) [PAVE] species represented by $CF_2=CF-ORf^1$ (in which $Rf^1$ represents a perfluoroalkyl group containing 1-8 carbon atoms), vinyl monomers represented by $CX^3X^4=CX^5 (CF_2)_nX^6$ (in which $X^3$, $X^4$ and $X^5$ are the same or different and each represents hydrogen or fluorine atom, $X^6$ represents hydrogen, fluorine or chlorine atom and n represents an integer of 1 to 10) and alkyl perfluorovinyl ether derivates represented by $CF_2=CF-OCH_2-Rf^2$ (in which $Rf^2$ is a perfluoroalkyl group containing 1 to 5 carbon atoms).

As the above-mentioned PAVE, there may be mentioned perfluoro (methyl vinyl ether) [PMVE], perfluoro (ethyl vinyl ether) [PEVE], perfluoro (propyl vinyl ether) [PPVE], perfluoro (butyl vinyl ether) and the like and, among them, PMVE, PEVE or PPVE is more preferred.

Preferred as the above-mentioned alkyl perfluorovinyl ether derivatives are those in which $Rf^2$ is a perfluoroalkyl group containing 1 to 3 carbon atoms; $CF_2=CF-OCH_2-CF_2CF_3$ is more preferred.

The above-mentioned monomer [α] may further be an unsaturated carboxylic acid copolymerizable with CTFE and TFE as described in International Publication WO 2005/100420.

The above-mentioned unsaturated carboxylic acid is preferably one having at least one carbon-carbon unsaturated bond enabling copolymerization (hereinafter referred to also as "copolymerizable carbon-carbon unsaturated bond") in each molecule and having at least one carbonyloxy group [—C(=O)—O—] in each molecule.

The unsaturated aliphatic carboxylic acid may be an unsaturated aliphatic monocarboxylic acid or an unsaturated aliphatic polycarboxylic acid containing two or more carboxyl groups and includes, among others, (meth) acrylic acid, crotonic acid, maleic acid, fumaric acid, itaconic acid, citraconic acid, mesaconic acid, aconitic acid and like unsaturated aliphatic carboxylic acids containing 3 to 6 carbon atoms.

The unsaturated aliphatic carboxylic acid may also be an unsaturated aliphatic polycarboxylic acid containing 3 to 6 carbon atoms. The unsaturated aliphatic polycarboxylic acid is not particularly restricted but includes, among others, maleic acid, fumaric acid, itaconic acid, citraconic acid, mesaconic acid and aconitic acid; it may also be the acid anhydride of maleic acid, itaconic acid or citraconic acid.

The monomer [α] may also be an unsaturated compound represented by the general formula:

$$CX^7_2=CY^1-(Rf^3)_n-Z^1$$

wherein $Z^1$ represents an adhesive functional group, which is to be described later herein, $X^7$ and $Y^1$ are the same or different and each represents a hydrogen or fluorine atom, $Rf^3$ represents an alkylene group containing 1 to 40 carbon atoms, a fluorinated oxyalkylene group containing 1 to 40 carbon atoms, an ether bond-containing fluorinated alkylene group containing 1 to 40 carbon atoms or an ether bond-containing fluorinated oxyalkylene group containing 1 to 40 carbon atoms and n represents 0 or 1.

The above-mentioned FEP-based copolymer preferably has a TFE unit content of 98 to 80 mole percent and an HFP unit content of 2 to 20 mole percent.

The above-mentioned FEP-based copolymer may comprise, in addition to the TFE units and HFP units, monomer [$α^1$] units derived from a monomer [$α^1$] copolymerizable with TFE and HFP.

The above-mentioned monomer [$α_1$] is not particularly restricted but may be any of the compounds copolymerizable with TFE and HFP, including those compounds enumerated hereinabove referring to the monomer [α].

When it contains monomer [$α^1$] units, the above-mentioned FEP-based copolymer is preferably one having a total content of HFP and TFE units of 90 to 99.9 mole percent and a monomer [$α^1$] unit content of 0.1 to 10 mole percent since such one is excellent in flexibility and low fuel permeability.

In the practice of the invention, the above-mentioned fluororesin, when it contains an adhesive functional group, can provide a fuel tank excellent in impact resistance and strength since the adhesiveness thereof to the thermoplastic resin is improved.

As the adhesive functional group, there may be mentioned, for example, a carbonyl group, a hydroxyl group and an amino group, among others.

The "carbonyl group" so referred to herein is a carbon-derived divalent group comprising a carbon-oxygen double bond, typically the group represented by —C (=O)—. The carbonyl group is not particularly restricted but may be a moiety of such a chemical structure as a carbonate group, a carboxylic acid halide group (haloformyl group), a formyl group, a carboxyl group, a carbonyloxy bond [—C(=O)O—], an acid anhydride bond [—C(=O)O—C(=O)—], an isocyanato group, an amido group, an imido group [—C(=O)—NH—C(=O)—], a urethane bond [—NH—C(=O)O—], a carbamoyl group [NH$_2$—C(=O)—], a carbamoyloxy group [NH$_2$—C(=O)O—], a ureido group [NH$_2$—C(=O)—NH—] or an oxamoyl group [NH$_2$—C(=O)—C(=O)—], for instance.

At least one hydrogen atom bound to the nitrogen atom of an amido group, imido group, urethane bond, carbamoyl group, carbamoyloxy group, ureido group or oxamoyl group, for instance, may be substituted by a hydrocarbon group such as an alkyl group.

The above-mentioned adhesive functional group is preferably selected from among amido, carbamoyl, hydroxyl, carboxyl, carbonate and carboxylic acid halide groups from the viewpoint that the resin obtained has an appropriate level of heat resistance and good adhesiveness at relatively low temperatures; in particular, those carbonate group and/or carboxylic acid halide group-containing ones which are described in WO 99/45044 are preferred among others.

When the fluororesin to be used in the practice of the invention contains an adhesive functional group, it may comprise a polymer whose main chain is an adhesive functional group-terminated one or which has such group or groups on a side chain or chains, or may comprise a polymer whose main chain is an adhesive functional group-terminated one and which further has such group or groups on a side chain or chains. When the main chain thereof is an adhesive functional group-terminated one, the fluororesin may have such groups on both ends of the main chain or may have only one such group on either of the ends thereof. When the adhesive functional group contains an ether bond, one or more such adhesive functional groups may occur in the main chain.

The above-mentioned fluororesin is preferably one comprising a polymer whose main chain is an adhesive functional group-terminated one, since such fluororesin will not markedly reduce the mechanical characteristics or chemical resistance or it is advantageous from a productivity and cost points of view.

The number of adhesive functional groups which the above-mentioned fluororesin has can be appropriately selected according to a counter material species to be used for lamination, the shape, the purpose of adhesion, the intended use, the adhesion strength required, the fluororesin species and the method of bonding and other differences. Preferably, however, the number of adhesive functional groups is 3 to 1000 per $1×10^6$ main chain carbon atoms in the polymer constituting the fluororesin.

As for the method of adhesive functional group introduction, a monomer or monomers containing such a functional group as mentioned above may be introduced into the polymer by copolymerization or such a group may be introduced in the form of a polymerization initiator.

In the practice of the invention, the above-mentioned fluororesin preferably has a melting point of 160 to 270° C., although this range has no limitative meaning.

The molecular weight of the above-mentioned fluororesin is preferably within such a range that the mechanical characteristics, low fuel permeability and other characteristics required of the product fuel tank can be realized. When, for example, the melt flow rate [MFR] is employed as an indicator of the molecular weight, it is preferred that the MFR at an any temperature within the range of about 230 to 350° C., which is a molding temperature range for fluororesins in general, be 0.5 to 100 g/10 minutes.

The melting point of each resin as shown herein is a value determined as the temperature corresponding to the maximum value on a heat-of-fusion curve as measured using a DSC apparatus (product of Seiko) at a programming rate of 10° C./minute, and the MFR is a value determined by measuring the weight (g) of the polymer flowing out from a nozzle with a diameter of 2 mm and a length of 8 mm at each temperature and under a load of 5 kg during a unit time (10 minutes) using a melt indexer (product of Toyo Seiki Seisakusho).

The above-mentioned fluororesin can be obtained by any of the conventional polymerization methods known in the art, for example by suspension polymerization, solution polymerization, emulsion polymerization or bulk polymerization. In the polymerization mentioned above, the temperature, pressure and other conditions, the polymerization initiator and another additive or additives can be appropriately selected according to the composition and amount of the desired fluororesin.

The fluororesin layer may have a surface subjected to adhesiveness-imparting surface treatment for the purpose of improving the interlaminar bonding and of improving the shock resistance and strength of the product fuel tank.

The adhesiveness-imparting surface treatment to be carried out in the practice of the invention is not particularly restricted but there may be mentioned, for example, such known technologies as etching treatment, plasma treatment, corona treatment and photochemical treatment.

The above adhesiveness-imparting surface treatment can be carried out under conditions properly selected according to the composition of the fluororesin employed and other factors.

In the practice of the invention, the thermoplastic resin layer-constituting thermoplastic resin may be a fluorine-containing one but preferably is a fluorine-free one, provided that it is a polymer showing plasticity upon heating.

As the thermoplastic resin, there may be mentioned, for example, polyolefin resins, polyamide resins, modified polyolefin resins, polyvinyl resins, polyesters, ethylene/vinyl alcohol copolymers, polyacetal resins, polyurethane resins, polyphenylene oxide resins, polycarbonate resins, acrylic resins, styrenic resins, acrylonitrile/butadiene/styrene [ABS] resins, vinyl chloride-based resins, cellulosic resins, polyetheretherketone [PEEK] resins, polysulfone resins, polyethersulfone [PES] resins, polyetherimide resins and polyphenylene sulfide resins. Among them, polyolefin resins, polyamide resins and modified polyolefin resins are preferred in view of their flexibility, adhesiveness and moldability, and ethylene/vinyl alcohol resins are preferred from the adhesiveness and low fuel permeability points of view.

As the polyolefin resin, there may be mentioned propylene homopolymers, propylene-ethylene block copolymers, low-density polyethylene, medium-density polyethylene, high-density polyethylene and ultrahigh-density polyethylene, among others.

As the modified polyolefin resin, there may be mentioned, for example, maleic acid modifications, epoxy modifications or amine ($NH_2$) modifications of propylene homopolymers, propylene-ethylene block copolymers, low-density polyethylene, medium-density polyethylene, high-density polyethylene, ultrahigh-density polyethylene, etc.

The polyamide resins mentioned above each comprises a polymer having an amide bond [—NH—C(=O)—] as a repeating unit within the molecule.

The polyamide resin may be a so-called nylon resin comprising a polymer resulting from bonding of each intramolecular amide bond to an aliphatic and/or an alicyclic structure (s) or a so-called aramid resin comprising a polymer resulting from bonding of each intramolecular amide bond to aromatic structures.

The above-mentioned nylon resin is not particularly restricted but includes, among others, those comprising such a polymer as nylon 6, nylon 66, nylon 11, nylon 12, nylon 610, nylon 612, nylon 6/66, nylon 66/12, nylon 46 or a metaxylylenediamine/adipic acid copolymer. Two or more of these may also be used in combination.

The polyamide resin may also comprise a polymer whose molecule partly contains a structure having no amide bond as the repeating unit and resulting from block copolymerization or graft copolymerization.

As such a polyamide resin, there may be mentioned, for example, those comprising a nylon 6/polyester copolymer, a nylon 6/polyether copolymer, a nylon 12/polyester copolymer, a nylon 12/polyether copolymer and a like polyamide elastomer.

These polyamide elastomers are the ones obtained by block copolymerization of nylon oligomers with polyester oligomers via ester bonding or the ones obtained by block copolymerization of nylon oligomers with polyether oligomers via ether bonding. As the polyester oligomers, there may be mentioned, for example, polycaprolactone and polyethylene adipate oligomers; as the polyether oligomers, there may be mentioned, for example, polyethylene glycol, polypropylene glycol and polytetramethylene glycol oligomers. Preferred as the polyamide elastomers are nylon 6/polytetramethylene glycol copolymers and nylon 12/polytetramethylene glycol copolymers.

The amine value of the polyamide resin mentioned above may be 10 to 60 (equivalents/$10^6$ g). A preferred lower limit thereto may be 15 (equivalents/$10^6$ g), a preferred upper limit thereto may be 50 (equivalents/$10^6$ g) and a more preferred upper limit may be 35 (equivalents/$10^6$ g).

The "amine value" so referred to herein is a value determined by dissolving 1 g of the polyamide resin in 50 ml of m-cresol with heating and titrating the solution with a $\frac{1}{10}$ N aqueous solution of p-toluenesulfonic acid with thymol blue as the indicator and, unless otherwise specified, it means the amine value of the polyamide resin prior to lamination.

The above-mentioned ethylene/vinyl alcohol resin is the one obtained by hydrolyzing an ethylene/vinyl acetate copolymer obtained from ethylene and vinyl acetate.

The mixing ratio between ethylene and vinyl acetate to be copolymerized is appropriately selected according to the number of moles of vinyl acetate units as defined by the formula given later herein.

Preferred as the above-mentioned ethylene/vinyl alcohol resin are those satisfying the relation $X \times Y/100 \geq 7$, wherein X is the vinyl acetate unit mole percent and Y is the percent degree of hydrolysis.

When $X \times Y/100 < 7$, the interlaminar bonding strength may sometimes be insufficient. The relation $X \times Y/100 \geq 10$ is more preferred.

The above-mentioned $X \times Y/100$ value serves as an indicator of the content of the hydroxyl groups which the above-mentioned ethylene/vinyl alcohol resin has. That the value of $X \times Y/100$ is high means that the content of the hydroxyl groups which the above ethylene/vinyl alcohol resin has is high.

The hydroxyl groups are groups capable of participating in the adhesion to the lamination counterpart material relative to the ethylene/vinyl alcohol resin layer and, when the hydroxyl group content is high, the interlaminar bonding in the product part is improved. The term "lamination counterpart material" as used herein refers to the material involved in lamination in contact with the EVOH resin layer.

The "vinyl acetate unit mole percent X" so referred to herein is a proportion of the vinyl acetate unit-derived number [$N_i$] of moles of vinyl acetate relative to the total number [N] of moles of ethylene and vinyl acetate as added in each molecule of the above-mentioned ethylene/vinyl alcohol resin, and means the mean value of the mole contents $X_i$ represented by the formula:

$$X_i(\%)=(N_i/N)\times 100.$$

The above-mentioned vinyl acetate unit mole percent X is the value obtained by infrared absorption spectrometry [IR] measurement.

The term "vinyl acetate unit" as used herein means a vinyl acetate-derived moiety constituting a part of the molecular structure of the above-mentioned ethylene/vinyl alcohol resin. The vinyl acetate unit may have a hydroxyl group as a result of hydrolysis thereof or have an acetoxyl group in the unhydrolyzed state.

The "degree of hydrolysis" mentioned above is the proportion, in percentage, of the number of hydrolyzed vinyl acetate units to the sum of the number of hydrolyzed vinyl acetate units and the number of unhydrolyzed vinyl acetate units. The degree of hydrolysis is a value obtained by infrared absorption spectrometry [IR] measurement.

As commercial products which fall under the category of the above-mentioned ethylene/vinyl alcohol resin and satisfying the above-mentioned relation between X and Y, there may be mentioned, for example, Eval F101 (product of Kuraray Co., Ltd., vinyl acetate unit X=68.0 mole percent; degree of hydrolysis Y=95%; X×Y/100=64.6), Melthene H6051 (product of Tosoh Corporation, vinyl acetate unit X=11.2 mole percent; degree of hydrolysis Y=100%; X×Y/100=11.2) and Technolink K200 (product of Taoka Chemical Co., Ltd., vinyl acetate unit X=11.2 mole percent; degree of hydrolysis Y=85%; X×Y/100=9.52).

The above-mentioned ethylene/vinyl alcohol resin preferably has an MFR, at 200° C., of 0.5 to 100 g/10 minutes.

When the above-mentioned MFR is either lower than 0.5 g/10 minutes or is in excess of 100 g/10 minutes, the difference between the melt viscosity of the ethylene/vinyl alcohol resin and the melt viscosity of the counterpart fluororesin becomes large, unfavorably causing an uneven thickness distribution in each layer. A preferred lower limit is 1 g/10 minutes, and a preferred upper limit is 50 g/10 minutes.

The above-mentioned thermoplastic resin layer may comprise only one of the above-mentioned thermoplastic resins or two or more of them.

In the practice of the invention, the thermoplastic resin preferably has a melting point of 100 to 270° C.

The above-mentioned fluororesin layer and/or thermoplastic resin layer may contain one or more of various fillers such as inorganic powders, glass fibers and metal oxides each incorporated therein at an addition level not causing any impairment in performance characteristics according to the purpose and/or intended use and, further, may contain, in addition to a filler or fillers, one or more of heat stabilizers, reinforcing agents, ultraviolet absorbers, pigments and other any additives as incorporated therein.

As the additives mentioned above, there may be added, for example, montmorillonite, beidellite, saponite, nontronite, hectorite, sauconite, stevensite and like lamellar smectite clay minerals as well as microlamellar minerals having a high aspect ratio, for example mica species, for reducing the levels of permeation of liquid chemicals.

As such an additive as mentioned above, there may be added, for example, an electrically conductive filler for imparting electric conductivity. The electrically conductive filler is not particularly restricted but may be, for example, a powder or fibrous form of a conductive simple substance, such as a metal or carbon; a powder form of a conductive compound such as zinc oxide; or a powder provided with electric conductivity by surface treatment.

The powder- or fibrous-form conductive simple substance is not particularly restricted but includes, among others, metal powders such as copper and nickel powders; metal fibers such as iron and stainless steel fibers; carbon black, carbon fibers, and carbon fibrils described in Japanese Kokai Publication H03-174018 and elsewhere.

The powder provided with electric conductivity by surface treatment is a powder derived from glass beads or such a nonconductive powder as a titanium oxide powder by surface treatment for rendering the surface thereof electrically conductive.

The method of treatment for rendering the surface conductive is not particularly restricted but includes, among others, metal sputtering and nonelectrolytic plating. Among the conductive fillers mentioned above, carbon black is suitably used since it is advantageous from a economical viewpoint and from a static charge storage inhibition viewpoint. When the conductive filler is incorporated, it is preferred that pellets be prepared in advance by melting and kneading the resin with the filler.

The conductive resin composition with the filler incorporated therein preferably has a volume resistivity of $1\times 10^0$ to $1\times 10^9$ Ω·cm. A more preferred lower limit is $1\times 10^2$ Ω·cm and a more preferred upper limit is $1\times 10^6$ Ω·cm.

In the case of providing electric conductivity, the innermost layer-forming fluororesin to come into contact with a fuel may alone be provided with electric conductivity. In this case, the fluororesin layer may also be provided with a conductive fluororesin layer as a further inner layer relative thereto.

Generally, the above-mentioned parts of the fuel tank are mutually the same in laminate structure. These parts may have a laminate structure comprising one fluororesin layer and one thermoplastic resin layer or may comprise two or more fluororesin layers and/or thermoplastic resin layers provided that the fluororesin layer after joining constitutes the inner surface layer of the fuel tank.

In the above-mentioned parts of the fuel tank, the thermoplastic resin layer preferably has (1) a single layer structure comprising at least one thermoplastic resin selected from the group consisting of polyamide resins, polyolefin resins, modified polyolefin resins and ethylene/vinyl alcohol resins or (2) a multilayer structure comprising a laminate made of such single layers.

The thermoplastic resin layer having the laminate structure (2) mentioned above preferably has a two-layer structure comprising a polyolefin resin layer and a modified polyolefin resin layer or a polyolefin resin layer/modified polyolefin resin layer/polyamide resin layer three-layer structure.

The inner surface layer of the fuel tank of the invention is constituted of a fluororesin layer, and the fuel tank is produced by joining the above-mentioned parts together so that at least the fluororesin layers may be bonded to each other; therefore, it retains the laminate structure of the parts.

The laminate structure of the fuel tank preferably comprises the modified polyolefin resin layer as an intermediate layer, for example in a fluororesin layer/modified polyolefin resin layer/polyolefin resin layer (inner surface layer/intermediate layer/external layer) or fluororesin layer/polyamide resin layer/modified polyolefin layer/polyolefin resin layer (inner surface layer/intermediate layer 1/intermediate layer 2/external layer) structure, so that the adhesion between the fluororesin and polyolefin resin may be improved.

As the above fuel tank laminate structure (inner surface layer/(intermediate layer 1)/(intermediate layer 2)/external layer), there may be mentioned, for example, a fluororesin layer/$NH_2$-modified polyethylene resin layer/polyethylene resin layer structure, a fluororesin layer/polyamide resin layer/maleic acid-modified polyethylene resin layer/polyethylene resin layer structure, a fluororesin layer/polyamide resin layer structure and a fluororesin layer/polyamide resin layer/(ethylene/vinyl alcohol resin layer)/polyethylene resin layer structure, and those laminate structures in which the fluororesin layer is made of a CTFE-based copolymer or a FEP-based copolymer are preferred among others.

In addition to the layers mentioned above, a recycle layer may further be incorporated using pellets obtained by melting and kneading, on a twin-screw extruder or single screw extruder, waste resin materials caused on a occasion of processing into a multilayer tank and/or resins separated from a recovered multilayer tank for recycling.

In the fuel tank mentioned above, the shape and size of the respective parts are not particularly restricted but can be selected in accordance with the shape of the fuel tank provided that they have the above-mentioned laminate structure.

In the above-mentioned fuel tank, the fluororesin layer can have a thickness of 50-500 μm, and the thermoplastic resin layer can have a thickness of 100-50000 μm.

The thickness of the fluororesin layer is preferably 100-300 μm, and the thickness of the thermoplastic resin layer is preferably 300-20000 μm.

In the present specification, the thickness of each of the fluororesin layer and the above-mentioned thermoplastic resin layer is the thickness measured by means of a microscope or the like and, when such a layer has a multilayer structure, the thickness represents the total thickness of the constituent layers.

The method of producing the fuel tank of the invention comprises (1) the step of producing a plurality of molded parts each having the laminate structure comprising the fluororesin layer and the thermoplastic resin layer and (2) the step of joining the molded parts obtained in the above step (1) in such a manner that at least the fluororesin layers may jointly form the inner surface layer of the tank.

The method of producing the fuel tank of the invention comprises joining a plurality of molded parts together and therefore can be carried out on simple apparatus as compared with a production method comprising blow molding for molding the fuel tank in one stage, hence the equipment investment can be reduced; even when the fuel tank is complicated in shape, the fuel tank, which is high in dimensional accuracy and excellent in strength, can be produced with ease.

This production method comprises joining of a plurality of molded parts together and, on that occasion, the tank is produced in such a manner that the fluororesin layers, which are excellent in low fuel permeability, may jointly form the inner surface layer; therefore, the tank obtained can be excellent in strength and durability, with the pinched portion(s) and joined site(s) being as good as the other sites in low fuel permeability.

In the step (1) mentioned above, the plurality of molded parts have the same laminate structure, and each comprises the fluororesin layer and the thermoplastic resin layer and constitutes a part of the configuration of the fuel tank.

The shape and size of each molded part is not particularly restricted but can be selected according to the morphology of the fuel tank to be obtained.

The thickness of the fluororesin layer and the thickness of the thermoplastic layer in each of the molded parts mentioned above are respectively as described hereinabove referring to the fuel tank of the invention.

The fuel tank obtained by the above-mentioned production method may be one produced from two molded parts or one produced from three or more molded parts.

In the step (1) mentioned above, the molded parts can be obtained by injection molding or by thermoforming of laminated sheets, although the molding method is not limited thereto.

Each of the molding methods mentioned above may be applied to part of the plurality of molded parts or to all of them.

In the step (1) mentioned above, the molded parts may be produced by employing different methods according to the molded parts.

In the step (1) mentioned above, the injection molding can be carried out, for example, by a method comprising injecting a molten thermoplastic resin into a mold for a molded part, allowing the same to solidify and then injecting, onto the thus-molded thermoplastic resin layer, a molten fluororesin and allowing the same to solidify to form a fluororesin layer; or by a method comprising injecting a molten fluororesin into a mold for a molded part, allowing the same to solidify and then injecting, onto the thus-molded fluororesin resin layer, a molten thermoplastic resin and allowing the same to solidify to form a thermoplastic resin layer.

In the above-mentioned injection molding, the above-mentioned step of molding the thermoplastic resin layer or fluororesin layer, which comprises injection and solidification, may be carried out twice or more times and, in this case, a molded part having a laminate structure comprising two or more thermoplastic resin layers and/or fluororesin layers can be obtained.

In the case of carrying out the step of molding of each layer twice or more times, as mentioned above, a molded part having a laminate structure comprising two or more different thermoplastic resin layers and/or fluororesin layers can be obtained by using different resin species for injection in the respective steps of molding.

In the above-mentioned step of molding of each layer, it is preferred from the improved interlaminar adhesion viewpoint that the injection of the resin constituting each layer be followed by application of pressure while the mold temperature is maintained at 220-300° C., preferably about 240-280° C.

The order of the steps of molding the respective layers can be properly selected according to a desired laminate structure; thus, as mentioned above, the thermoplastic resin layer to serve as the external layer may be molded first or the fluororesin layer to serve as the inner surface layer may be molded first.

The respective injection molding conditions can be appropriately selected according to the kinds and amounts of the fluororesin and thermoplastic resin employed.

In the above-mentioned step (1), the thermoforming of a laminated sheet is carried out using, as the constituent material, a sheet or plate having a laminate structure comprising the thermoplastic resin layer and the fluororesin layer as prepared in advance (such sheet or plate is hereinafter referred to as "resin laminate sheet").

The resin laminate sheet is the same in composition as the desired molded part. The resin laminate sheet can be prepared in a conventional manner, for example by coextrusion or lamination; from the production efficiency viewpoint, coextrusion molding is preferred.

The method of thermoforming of the above-mentioned laminate sheet may be any of the molding methods known in the art, for example the step comprising heating the above-mentioned resin laminate sheet and then pressing the sheet against a mold under vacuum or pressure application (vacuum forming, pressure forming or press molding).

The heating in the above-mentioned thermoforming is preferably carried out at a temperature not lower than the melting point of the resin having the highest melting point among the laminating materials although the temperature may vary depending on the resin species employed.

The conditions in the above-mentioned vacuum forming can be properly selected according to the composition and thickness of the resin laminate sheet used; it is preferred, however, to employ, in the first step of heating the resin laminate sheet, different temperatures for the upper and lower heaters according to the melting temperatures of the respective layers.

The above-mentioned molded part can also be obtained by preparing a laminate comprising the fluororesin layer and the thermoplastic resin layer by carrying out the above-mentioned vacuum forming and then, while retaining the laminate in the mold, further injecting a thermoplastic resin onto the surface of the laminate, followed by solidification. In this method, the conditions in each step can be properly selected according to the resin species employed and other factors. From the improved adhesiveness viewpoint, it is preferred that the mold temperature and/or pressure after injection be set at a high level.

The above-mentioned molded part may be one having a fluororesin layer, which constitutes the inner surface layer, formed by coating.

The fluororesin layer formation by coating can be carried out, after obtaining a molded part comprising the thermoplastic resin layer and having the desired shape by the abovementioned injection molding or vacuum forming technique, by applying a fluororesin-containing coating composition to the molded part by any of methods known in the art, followed by drying.

The fluororesin layer formed by the above-mentioned coating is preferably fluorinated by any of methods known in the art for further improving the low fuel permeability thereof. Thus, it is also possible, after forming a coat layer with a fluororesin-containing coating composition in which a nonperfluorinated resin such as a PVdF-based copolymer or a fluorinated vinyl polymer, an ETFE-based copolymer or an EFEP-based copolymer is used and which is low in baking temperature and/or fluorine content, to fluorinate the coat layer to form a fluororesin layer excellent in low fuel permeability.

According to the production method of the invention, the fuel tank is obtained via the step (2) of joining such molded parts as mentioned above in such a manner that at least the fluororesin layers may jointly form an inner surface layer.

The joining of the above-mentioned molded parts can be realized, for example, by melting the peripheral edge areas of respective molded parts by means of a hot plate and subjecting them to mutual thermal bonding (hereinafter also referred to as "thermal fusion bonding"). The fusion by means of the hot plate is preferably carried out at a temperature not lower than the melting point of the fluororesin or thermoplastic resin to be subjected to bonding and not higher than the thermal decomposition temperature of the thermoplastic resin, although the temperature can be selected according to the layer constitution of the molded parts used.

The thermal bonding conditions can be properly selected according to the layer constitution of the moldings to be used.

As the method of thermal fusion bonding, there may be mentioned, among others, the method using a hot platen, the method utilizing hot air, the method utilizing frictional heat (mechanical, ultrasonic) and the method utilizing high-frequency waves.

The above-mentioned methods of thermal fusion bonding may be carried out in combination.

The laminated sheets molded by such a method as vacuum forming, pressure forming, male die molding or injection molding in the above-mentioned step (1) may also be once cooled and then processed into a bag-shaped product by such a thermal fusion bonding method as mentioned above. In the case of vacuum forming, pressure forming or male die molding, the laminated sheets are already in a heated condition, hence it is preferred, from the production efficiency viewpoint, that the thermal fusion bonding be carried out immediately thereafter.

Further, a technique of electrofusion (electric fusion bonding) using an electric heating wire at the fusion bonding site(s) can also be used as a method of thermal fusion bonding.

From the low fuel permeability and chemical resistance viewpoint, the fuel tank of the invention is preferably produced by fusion bonding between the fluororesin layers of the respective parts from the mechanical strength viewpoint, it is further preferred that the thermoplastic resins layers, in particular external polyolefin layers be mutually fusion-bonded.

Figure 1:
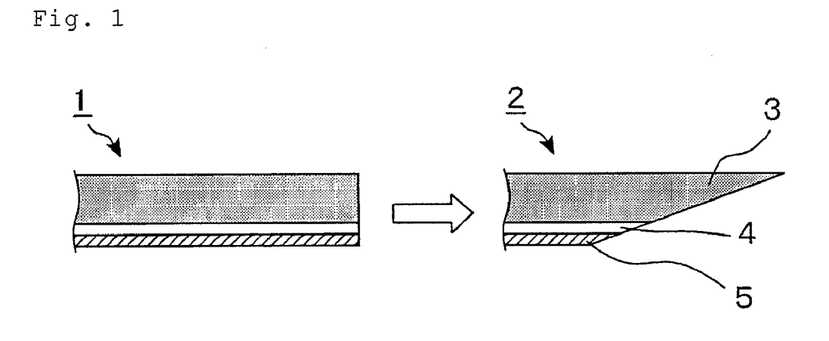
[FIG. 1] The FIGURE shows an example of the mode of preliminarily processing the edge end of each molded part to be submitted to joining.

For facilitating mutual fusion bonding between respective layers, at least part of the edge of each molded part to be subjected to fusion bonding may be preliminarily processed as shown in FIG. 1.

In the following, an exemplary mode of edge processing of each molded part to be fusion-bonded is described, referring to FIG. 1. FIG. 1 shows an example of the mode of preliminary processing of the edge of each molded part to be subjected to joining. The numeral 3 stands for the polyolefin resin layer, 4 the modified polyolefin resin layer, and 5 the fluororesin layer. By processing the edge of the molded part 1 before processing into that of the molded part 2 after processing, it becomes possible to facilitate the fusion bonding of the respective layers. It is also possible to subject the edge of a product of fusion bonding of two formed parts 1 before processing to the same processing as mentioned above, followed again by fusion bonding.

Even on the occasion of scrapping of an automobile, the fluororesin alone can be extracted, for recycling, from the fuel tank of the invention by degrading and dissolving the fluorine-free thermoplastic resin by an appropriate combination of high-temperature treatment, high-pressure treatment and other treatments in the presence of steam or a solvent.

In view of the excellent chemical resistance thereof, the fuel tank of the invention can suitably be used also as a tank for an aqueous solution of urea for use in a $NO_x$-reducing system in which diesel engine exhaust gas is sprayed with the aqueous urea solution. In addition, it can also be used as a tank, bottle or storage vessel or the like for use in general industry or semiconductor manufacture where chemical resistance and nonstickiness are required.

Effects of the Invention

The fuel tank of the invention, which has the constitution described hereinabove, is excellent in low fuel permeability, strength and durability and can be produced at low cost. The method of producing the fuel tank of the invention can be carried out at low cost and can produce a fuel tank complicated in shape with ease.

BEST MODES FOR CARRYING OUT THE INVENTION

The following examples illustrate the present invention more specifically. These examples are, however, by no means limitative of the scope of the invention.

The composition-related amounts given in the examples are given on the mass basis, unless otherwise specified.

Measurement of the Fuel Permeability Coefficient of Each Material

Each of the copolymers, each in pellet form, for use as the respective layers of a tubular laminate was placed in a mold with a diameter of 120 mm, the whole was set on a press heated to a temperature not lower than the melting point, and the copolymer pellets were melted and pressed at a pressure of about 2.9 MPa to give a 0.15-mm-thick sheet. A SUS316 stainless steel cup for permeability coefficient measurement, 40 mm Φ in inside diameter and 20 mm in height, containing 18 ml of CE10 (isooctane/toluene/ethanol mixed solvent, isooctane:toluene:ethanol=45:45:10 (volume ratio)) or CE85 (isooctane/toluene/ethanol mixed solvent, isooctane:toluene/ethanol=7.5:7.5:85 (volume ratio)) was covered with the sheet obtained, and the changes in mass at 60° C. were measured over 1000 hours. The fuel permeability coefficient (g·mm/m$^2$/day) was calculated based on the change in mass per hour, the surface area of the sheet portion in contact with the liquid and the sheet thickness.

Rate of Fuel Permeation Through the Tank Wall

The tank was filled with CE10 or CE85 in an amount of 80% by volume of the tank capacity, the changes in mass of the tank at 60° C. were measured, and the mass of the fuel permeating per day and per unit inside surface area was calculated (g/m$^2$/day).

Tensile Strength

Microdumbbell test specimens were punched out from tanks before and after fuel storage using a microdumbbell die described in ASTM D 1708, and the microdumbbells were pulled on a Tensilon tester (product of Orientec Co.) at room temperature at a rate of pulling of 100 mm/minute, and the maximum point strength of each specimen was measured. The microdumbbells after fuel storage were die-cut from those tank portions that had been in contact with the fuel.

Example 1

Two molded parts respectively corresponding, in shape, to an upper half structure and a lower half structure of a tank (size: 400 Φ, height 100 mm) and having a layer structure comprising a CTFE copolymer/polyamide 6 layer/maleic acid-modified polyethylene layer/polyethylene layer in that order from the inner surface layer were prepared by injection molding.

The layer structure of the tank parts was as shown below.

Inner surface layer: the following adhesive functional group-containing CTFE-based copolymer, thickness 300 μm (Adhesive Functional Group-Containing CTFE-Based Copolymer)

A jacketed polymerization vessel equipped with a stirrer and capable of containing 175 kg of water was charged with 50 kg of demineralized pure water, the inside space was replaced with pure nitrogen gas to a sufficient extent, and the nitrogen gas was then removed by evacuation. Then, 40.5 kg of octafluorocyclobutane, 2.4 kg of chlorotrifluoroethylene [CTFE], 6.5 kg of tetrafluoroethylene [TFE] and 4.5 kg of perfluoro (propyl vinyl ether) [PPVE] were fed under pressure into the vessel, the temperature was adjusted to 35° C., and stirring was started. Thereto was added 0.2 kg of a 50% (by mass) methanol solution of di-n-propyl peroxydicarbonate [NPP] as a polymerization initiator to initiate the polymerization. During polymerization, a monomer mixture prepared which had the same composition as the desired copolymer composition was additionally fed so that the vessel inside pressure might be maintained at 0.8 MPa; after such polymerization, the gaseous phase remaining in the vessel was discharged, and the polymer formed was taken out, washed with demineralized pure water and dried, whereby 19 kg of a granular powdery CTFE copolymer was obtained. The copolymer was then melted and kneaded using a Φ 50 mm single-screw extruder at a cylinder temperature of 280° C. and pelletized. Then, the CTFE copolymer obtained in the form of pellets was heated at 180° C. for 24 hours.

The pellets obtained had the following composition and physical properties.

CTFE/TFE/PPVE: 34.5/63.4/2.1 (mole percent)

Melting point: 230° C.

MFR: 18 g/10 minutes (297° C.-load 5 kg)

Functional groups: carbonate groups (number of carbonate groups per 10$^6$ carbon atoms: 100)

Fuel permeability coefficient: 0.3 g·mm/m$^2$/day (CE10)

Intermediate layer 1: polyamide 6 (UBE Nylon 1022B, product of Ube Industries), melting point: 220° C. Polyamide layer thickness: 100 μm.

Intermediate layer 2: maleic acid-modified polyethylene (product name Adomer HB500, product of Mitsui Chemicals), melting point 130° C. Maleic acid-modified polyethylene layer thickness: 100 μm.

External layer: polyethylene (Novatec HJ360, product of Japan Polyethylene Corp.), melting point: 131° C. Polyethylene layer thickness: 3000 μm.

The fuel tank was produced by heating the mating surface of each of the thus-formed two molded parts to 280° C. and the parts were joined together in the manner of pressure and fusion bonding.

With the fuel tank, the rate of fuel permeation was 0.9 g/m$^2$/day (CE10) or 0.5 g/m$^2$/day (CE85). The dumbbell tensile strength was retained at a level not lower than 75% even after fuel storage.

Example 2

Two molded parts respectively corresponding, in shape, to an upper half structure and a lower half structure of a tank (size: 400 Φ, height 100 mm) and having a layer structure comprising a CTFE copolymer/epoxy-modified polyethylene layer/polyethylene layer in that order from the inner surface layer were prepared by injection molding.

The layer structure of the tank parts was as shown below.

Inner surface layer: adhesive functional group-containing ETFE-based copolymer (product name: Neoflon EFEP RP-5000, product of Daikin Industries); melting point: 195° C. Wall thickness: 300 μm.

Fuel permeability coefficient: 6 g·mm/m$^2$/day (CE10)

Intermediate layer: epoxy-modified polyethylene (product name: Lotader AX8840, product of Arkema). Melting point: 105° C., epoxy-modified polyethylene layer thickness: 200 μm.

External layer: polyethylene (Novatec HJ360, product of Japan Polyethylene Corp.). Melting point: 131° C. Polyethylene layer thickness: 3500 μm.

The fuel tank was produced by heating the mating surface of each of the thus-formed two molded parts to 280° C. and the parts were joined together in the manner of pressure and fusion bonding.

With the fuel tank, the rate of fuel permeation was 18 g/m²/day (CE10) or 9 g/m²/day (CE85). The dumbbell tensile strength was retained at a level not lower than 75% even after fuel storage.

Example 3

A multilayer sheet was prepared by multilayer coextrusion molding at a die temperature of 280° C., and this sheet was made into a pair of parts of a tank (size: 400 Φ, height 100 mm) by vacuum forming; the molded parts formed had the following laminate structure: CTFE copolymer/epoxy-modified polyethylene layer/polyethylene layer.

The layer structure of the tank parts was as shown below.

Inner surface layer: adhesive functional group-containing CTFE-based copolymer (the same one as used in Example 1). Wall thickness: 300 µm.

Intermediate layer: epoxy-modified polyethylene (product name: Lotader ADX1200X, product of Arkema). Melting point: 105° C., epoxy-modified polyethylene layer thickness: 200 µm.

External layer: polyethylene (product name: HB111R, product of Japan Polyethylene Corp.). Polyethylene layer thickness: 3000 µm.

The fuel tank was produced by heating the mating surface of each of the thus-formed two molded parts to 280° C. and the parts were joined together in the manner of pressure and fusion bonding.

With the fuel tank, the rate of fuel permeation was 0.9 g/m²/day (CE10) or 0.5 g/m²/day (CE85). The dumbbell tensile strength was retained at a level not lower than 75% even after fuel storage.

The thus-produced fuel tanks were thus excellent in low fuel permeability and gasoline resistance.

INDUSTRIAL APPLICABILITY

The fuel tank of the invention, which has the constitution described hereinabove, is excellent in low fuel permeability, strength and durability and can be produced at low cost. Therefore, it can be used as a tank, bottle or storage vessel for chemicals in a chemical plant or the like. The method of producing the fuel tank of the invention can be carried out at low cost and can produce a fuel tank complicated in shape with ease.

EXPLANATION OF SYMBOLS

1. Molded part before processing
2. Molded part after processing
3. Polyolefin resin layer
4. Modified polyolefin resin layer
5. Fluororesin layer

The invention claimed is:

1. A fuel tank produced by joining of at least two discrete parts of a tank and each having a laminate structure comprising a fluororesin layer and a thermoplastic resin layer, at least the fluororesin layers of the parts being joined together to form the inner surface layer of the fluororesin layer,
    wherein the fluororesin layer-constituting fluororesin contains an adhesive functional group,
    the adhesive functional group is a carbonyl group, a hydroxyl group or an amino group,
    the thermoplastic resin layer has a two-layer structure consisting of a polyolefin resin layer and a modified polyolefin resin layer or a three-layer structure consisting of a polyolefin resin layer/modified polyolefin resin layer/polyamide resin layer.

2. The fuel tank according to claim 1,
    wherein the fluororesin layer-constituting fluororesin is a chlorotrifluoroethylene [CTFE]-based polymer or a tetrafluoroethylene/hexafluoropropylene [FEP]-based copolymer.

3. The fuel tank according to claim 1,
    wherein the fluororesin surface is one subjected to adhesiveness-imparting surface treatment.

4. A method of producing the fuel tank as claimed in claim 1, which comprises:
    (1) the step of producing a plurality of molded parts each having the laminate structure comprising the fluororesin layer and the thermoplastic resin layer and
    (2) the step of joining the molded parts obtained in the step (1) in such a manner that at least the fluororesin layers may jointly form the inner surface layer.

5. The method of producing the fuel tank according to claim 4, wherein the step (1) is a thermal forming step using, as the raw material, a sheet or plate having the laminate structure comprising the fluororesin layer and the thermoplastic resin layer.

6. The method of producing the fuel tank according to claim 5, wherein the step (1) is the step of heating the sheet or plate having the laminate structure comprising the fluororesin layer and the thermoplastic resin layer and then forming the same by pressing against a mold under vacuum or under pressure.

7. The method of producing the fuel tank according to claim 4, wherein the step (1) is carried out in the manner of injection molding.

* * * * *